(12) United States Patent
Iwamoto

(10) Patent No.: US 8,479,646 B2
(45) Date of Patent: Jul. 9, 2013

(54) DRAWER-TYPE COOKING DEVICE AND METHOD FOR CONTROLLING DOOR THEREOF

(75) Inventor: Masayuki Iwamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1316 days.

(21) Appl. No.: 12/163,606

(22) Filed: Jun. 27, 2008

(65) Prior Publication Data

US 2009/0025568 A1 Jan. 29, 2009

(30) Foreign Application Priority Data

Jul. 25, 2007 (JP) ................................. 2007-193756

(51) Int. Cl.
*A47J 43/28* (2006.01)
(52) U.S. Cl.
USPC ............................................ 99/342; 219/392
(58) Field of Classification Search
USPC ................... 99/342, 357, 331, 326, 325, 327, 99/335, 391; 219/681, 385, 756, 392, 391, 219/478, 494, 400, 411, 518, 685, 711, 402, 219/403, 401, 413, 502; 318/461, 466, 467, 318/253–300; 312/410, 236, 330.1, 407, 312/405, 325, 326, 327, 328, 329, 247, 312; 49/103, 109, 113, 352, 348, 386, 379, 339, 49/26–28, 31
See application file for complete search history.

(56) References Cited

U.S. PATENT DOCUMENTS

| | | | |
|---|---|---|---|
| 6,849,835 B2 | 2/2005 | Bollmers et al. | |
| 2001/0019054 A1* | 9/2001 | Kawamura et al. | 219/711 |
| 2002/0093301 A1* | 7/2002 | Itami et al. | 318/452 |
| 2006/0137248 A1* | 6/2006 | Ichinose | 49/340 |
| 2006/0163239 A1* | 7/2006 | Yoshidome et al. | 219/392 |
| 2006/0278629 A1* | 12/2006 | Gagas et al. | 219/385 |

FOREIGN PATENT DOCUMENTS

| | | |
|---|---|---|
| JP | 3-45820 A | 2/1991 |
| JP | 6-109257 A | 4/1994 |
| JP | 11-237053 A | 8/1999 |
| JP | 2005-76319 A | 3/2005 |
| JP | 2005-221081 A | 8/2005 |
| JP | 2006-38296 A | 2/2006 |
| JP | 2006-38300 A | 2/2006 |
| JP | 2008-122031 A | 5/2008 |

* cited by examiner

*Primary Examiner* — Henry Yuen
*Assistant Examiner* — Phuong Nguyen
(74) *Attorney, Agent, or Firm* — Birch, Stewart, Kolasch & Birch, LLP

(57) ABSTRACT

A drawer-type cooking device and a method for controlling opening and closing of a door thereof, in which an opening/closing direction and an absolute position of a door by a manual opening/closing operation by a user can be detected with a simple structure even when the door is in a door-open state in an intermediate position, is provided. A rotation sensor 26 is disposed in relation to an output shaft of a motor 25 for driving a door capable of opening and closing an opening of a cooking device body in an opening/closing direction. A microcomputer 20 controls drive of the motor 25 including a rotation direction by receiving an input of a detection signal of the rotation sensor 26, which is a sensor for generating two rotation pulses having different phases (for example, pulse train signals with a 120-degree difference) from the motor. A control device can determine the rotation direction of the motor 25 based on the two rotation pulses therefrom.

7 Claims, 11 Drawing Sheets

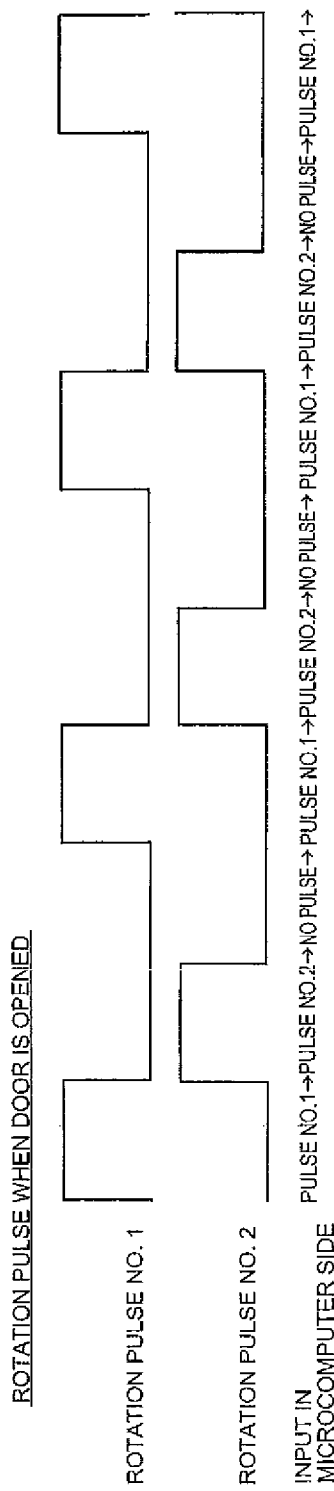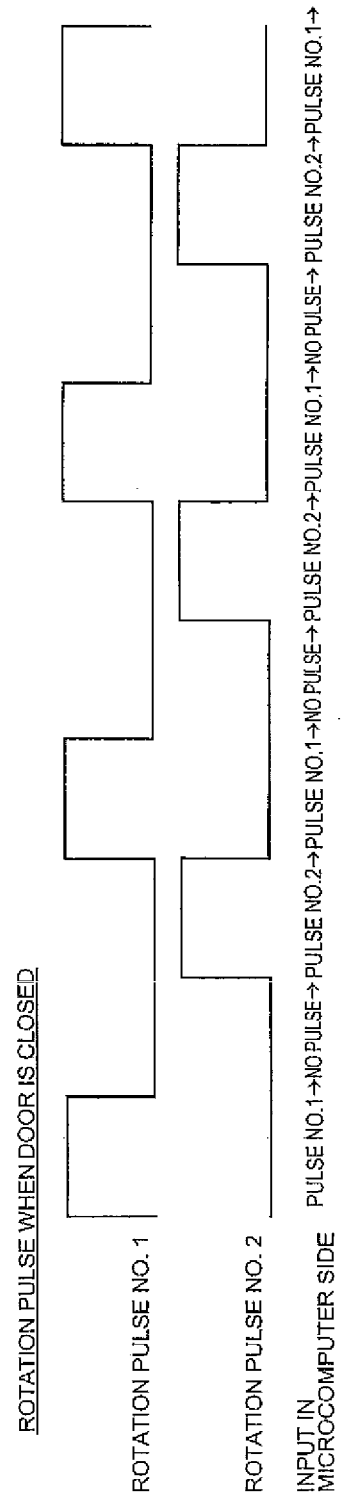

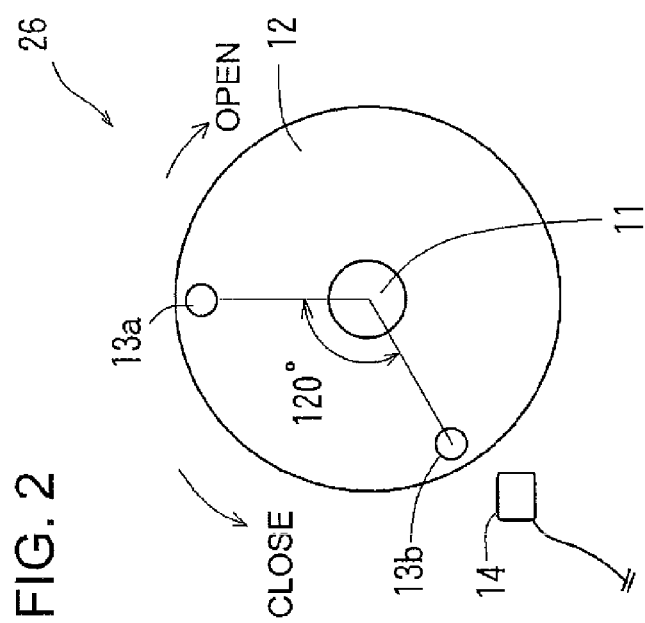

DRAWER-TYPE COOKING DEVICE AND METHOD FOR CONTROLLING DOOR THEREOF

The present application is based on and claims priority of Japanese patent application No. 2007-193756 filed on Jul. 25, 2007, the entire contents of which are hereby incorporated by reference.

BACKGROUND OF THE INVENTION

1. Field of the Invention

The present invention relates to a drawer-type cooking device, which can be provided with a manual operation assisting mechanism and a method for controlling opening and closing of a door thereof.

2. Description of the Related Art

In the related art, there has been proposed a cooking device comprising an apparatus body having a heating chamber in which an object to be heated is housed, a door for shielding the heating chamber from outside, a bottom plate moving in conjunction with the door, a sliding mechanism for sliding the bottom plate, a motor for driving the bottom plate, transmission means for transmitting a drive force of the motor to the bottom plate, a latch device for closing and retaining the door, a door open/close switch, and a control circuit for controlling drive of the motor so as to operate the door upon reception of a signal from the door open/close switch (Japanese Patent Laid-Open Publication No. 3-45820 (Patent Document 1)). The bottom plate is directly coupled to the lower portion of the door in the vicinity of the lower hem. When the door is opened, the sides of the bottom plate are in an open state.

Also, there has been proposed a cooking device in which a slide body in which an object to be heated is housed is slidably provided in a cooking device body, comprising detecting means for detecting that the slide body has been slid out, control means for outputting an excitation command signal when receiving a detection signal from the detecting means, and an electromagnet leg portion disposed on the bottom face of the cooking device body and excited when receiving the excitation command signal (Japanese Patent Laid-Open Publication No. 6-109257 (Patent Document 2)). When the slide body is slid out, the excitation command signal is output from the control means based on detection by the detecting means, and the electromagnet leg portion disposed on the bottom face of the cooking device body is excited. The electromagnet leg portion is chucked to a metallic placing face to prevent the cooking device from being turned over, so as to use the cooking device in a stable state all the time Also, there has been proposed a microwave oven, wherein a heating container having an opening in its top is provided so as to be freely drawn out from a body housing, a heating chamber for confining microwave is formed by the heating container and a lid portion provided in the body housing side and covering the opening of the heating container, and electromagnetic wave leakage is prevented by providing a choke groove between an opening peripheral portion of the heating container and the lid portion facing the opening peripheral portion, so as to eliminate the electromagnetic wave leakage even if a food placing portion has a movable drawer structure (Japanese Patent Laid-open Publication No. 11-237053 (Patent Document 3)).

There has been proposed a cooking device in which a placing portion of an object to be heated of a heating chamber has a drawable structure, comprising a cooking device body having a heating chamber, a drawer body movably disposed in the cooking device body such that the drawer body can be drawn out from the heating chamber of the cooking device body to the outside, and a slide rail for moving the drawer body in the cooking device body, wherein the slide rail is disposed outside of the heating chamber, so that it is not necessary to form the sliding mechanism with parts or a material having high heat resistance and flame resistance and it is possible to prevent the occurrence of faulty discharge by microwave (Japanese Patent Laid-Open Publication No. 2005-221081 (Patent Document 4)).

There has been proposed a drawer-type cooking device, wherein a drawer body having a door and a heating container in which an object to be heated is placed therein is disposed in a cooking device body in which a heating chamber using microwave is formed therein, in a movable manner between a housed position where the heating container is housed in the heating chamber, and a drawn-out position where the heating container is drawn out from the heating chamber to the outside, and a sliding mechanism allowing the drawer body to be moved is constituted by right and left slide rails outside of the heating chamber and a center slide rail in which a drive mechanism is disposed, the respective slide rails and the drive mechanism being disposed isolatedly from the heating chamber, so that the slide rails and the drive mechanism are not exposed to a high temperature and microwave or are not affected by food debris which could cause a breakdown (Japanese Patent Laid-Open Publication No. 2006-38296 (Patent Document 5)). Also, there has been disclosed a drawer-type food warmer having a moving rail only on the bottom face and in which the right and left side faces are opened (U.S. Pat. No. 6,849,835B2 (Patent Document 6)).

The inventions described in the above respective documents seem to have following points to be improved concerning supporting of the door. That is, in the inventions disclosed in Japanese Patent Laid-Open Publication No. 3-45820, Japanese Patent Laid-Open Publication No. 6-109257, Japanese Patent Laid-Open Publication No. 11-237053 (Patent Documents 1 to 3), the lower side portion of the door is only butt against the bottom plate to be fixed thereto. Thus, in the case where the door is heavily loaded by body weight, a heated object or the like, an fixed portion of the door and the bottom plate could be deformed. If the fixed portion is deformed, there is a possibility that microwave for heating leak from a gap generated between the inclined door and the body to the outsider and it is necessary to pay enough caution when the load is put on the door.

In the Japanese Patent Laid-Open Publication No. 2005-221081 (Patent Document 4), the moving mechanism is provided in right and left side walls outside of the heating chamber, and an angle for fixing the moving mechanism is attached to the door. Therefore, a force acting on the door is supported by the cooking device body by being relatively dispersed via the moving mechanism provided in the right and left and the center of the lower portion. Even when the drawer body is drawn out, the door is not inclined forward and is stably supported by the cooking device body. However, in Japanese Patent Laid-Open Publication No. 2005-221081 (Patent Document 4), the moving mechanism disposed in the right and left side wall faces extend through the right and left sides of the heating container when the drawer body is drawn out. Thus, when an object to be heated, for example, a heavy object such as a pot with soup therein or the like is put into or removed from the heating container which is combined with the door, the moving mechanism stands in the way, and the usability is low. Furthermore, from the standpoint of appearance, the visual quality needs to be improved. Also, Japanese Patent Laid-Open Publication No. 2006-38296 (Patent Document 5), in which the moving mechanism for supporting the door of the drawer body is disposed at three places of right and left side wall faces and a bottom wall face outside of the heating chamber, has the similar points to be improved as those of Japanese Patent Laid-Open Publication No. 2005-221081 (Patent Document 4). Furthermore, although U.S. Pat. No. 6,849,835B2 (Patent Document 6) has such a similar point being provided with a drawer structure, however discloses not the cooking device, but an electric warming device, in which the drawer is only manually operated and does not have an electric moving mechanism. The electric warming device does not have an electromagnetic wave sealing mechanism or a latch hook as a safety mechanism since it is not a microwave oven. Since the drawer does not have the electric mechanism, a moving mechanism simply by a lower rail is employed.

FIG. 10 is a perspective view of a drawer-type cooking device having a conventional structure. FIG. 11 is a side view of the drawer-type cooking device shown in FIG. 10. A cooking device body 1 has a heating chamber 3 for cooking an object to be heated. A drawer body 2 is movably, namely, slidably disposed in the cooking device body 1 such that the drawer body 2 can be drawn out from the heating chamber 3 of the cooking device body 1 to the front side. The cooking device comprises a movable rail 8 formed of an angle member as a moving mechanism 4 for slidingly moving the drawer body 2 in the cooking device body 1. The drawer body 2 comprises a door 6 for opening and closing the heating chamber 3 and a heating container 7 for placing and housing an object to be heated. The heating container 7 has side walls in the right and left sides, a back wall in the back side disposed in the heating chamber 3 of the cooking device body 1, and an opening in the top, and the door 6 is fixed to the front thereof. When the door 6 closes an opening of the heating chamber 3, the internal space of the heating chamber 3 becomes a sealed space by internal wall faces of the cooking device body 1 and the drawer body 2, so as to prevent microwave from leaking.

The door 6 of the drawer body 2 is supported by the cooking device body 1 by right and left side wall faces located outside of the heating chamber 3 via the moving mechanism 4. The moving mechanism 4 comprises a fixed rail 9 and the movable rail 8 sliding along the fixed rail 9. The fixed rail 9 is attached to the right and left wall faces of the heating chamber 3 outside of the heating chamber 3 of the cooking device body 1. The movable rail 8 is attached to an internal side wall face of the door 6 via a fitting 10 so as to extend from the internal side wall face of the door 6 of the drawer body 2 to the inside of the heating chamber 3 of the cooking device body 1. Since the moving mechanism 4 for moving the drawer body 2 in the cooking device body 1 is disposed outside of the heating chamber 3, it is not necessary to use expensive parts or material having high heat resistance and flame resistance for the movable rail 8 and the fixed rail 9 which constitute the moving mechanism 4. Also, since the moving mechanism 4 is disposed outside of the heating chamber 3, a risk of discharge by microwave is eliminated without being affected by microwave emitted in the heating chamber 3. In order to drive the moving mechanism 4, a DC motor is disposed as a drive mechanism. A transmission mechanism such as a gear is coupled to a rotation output shaft of the DC motor, and a pinion positioned in the last stage of the transmission mechanism meshes and engages with a rack attached to the movable rail 8.

In the known drawer-type cooking device having an automatic opening and closing door driven by a motor, it is indispensable to detect and determine a door position in order to control opening and closing of the door. Since the rotation direction of the motor cannot be determined only by a single rotation pulse from the motor, it is necessary to use a sensor or a switch for detecting an absolute position. In the drawer-type cooking device, opening and closing control in a door position close to a fully closed position or a fully opened position is considered to be important, and a detection switch for detecting the door position is provided in a position close to the fully closed position or the fully opened position. A moving distance of the door can be obtained by accumulating the single rotation pulse from the motor.

However, in the case where a door opening/closing operation is manually performed in a place other than where the detection switch is provided, similar rotation pulses are obtained in the opening operation and the closing operation based on the single rotation pulse when the motor is manually rotated. Thus, if the door is stopped in a position where the detection switch is not provided, a microcomputer cannot determine whether the door is manually operated in the opening direction or the closing direction when a subsequent opening/closing operation is manually performed. As a result, even if a manual operation assisting mechanism is employed, a door opening/closing operation by assisting the manual operation cannot be performed in an intermediate stop position other than the fully opened position and the fully closed position. In order to detect the door position in the intermediate stop position other than the fully opened position and the fully closed position, it is necessary to dispose a plurality of position detecting switches in the intermediate stop position.

The present applicant has already filed a patent application concerning a drawer-type cooking device having a manual operation assisting function of detecting a manual opening/closing operation by a user and controlling rotation of a motor according to the opening/closing direction to assist the opening/closing operation by a user (Japanese Patent Application No. 2006-308976). The drawer-type cooking device achieves the manual operation assisting function, and detects the motor rotation direction by an optical sensor and a light generating element.

In relation to the door position, there has been proposed a power slide door device for vehicles, wherein first and second square-wave pulses having different phases are generated in response to actuation of a slide door which is opened and closed by drive means, four time interval data are detected in parallel from time interval data of rising pulse edges and falling pulse edges of the respective first and second square-wave pulses, and the drive means is controlled on the basis of the four time interval data with high accuracy obtained in one cycle, so as to safely actuate the slide door (Japanese Patent Laid-Open Publication No. 2005-76319 (Patent Document 7)).

When the speed of electrically opening and closing the drawer body 2 (FIG. 10 and FIG. 11) is controlled, the speed is determined by a duty ratio of a rectangular wave voltage supplied to the DC motor. If a control device malfunctions by breakdown or short circuit in the motor wiring such that the duty ratio of the rectangular wave output from the control device is set to the maximum, there is a risk that the opening/closing operation is performed at a maximum speed when it is not expected by a user. Conventionally, such a structure that a malfunction does not occur unless a plurality of failures occur at the same time is employed by using failure mode and effects analysis (FMEA). Also, it has been confirmed that, even if the malfunction occurs, the speed does not reach a dangerous door opening/closing speed from the relationship of the performance of the mounted DC motor, the structure of the drive mechanism and load weight. Therefore, a malfunction countermeasure is not particularly taken.

The automatic door opening and closing function of the drawer-type cooking device needs to be operated by a relatively high torque since the drawer body is moved with a heavy object of several kilograms placed thereon. Thus, an impact by collision at the time of the door opening/closing operation is great. As a function of reducing the impact, speed restriction is provided as disclosed in Japanese Patent Laid-Open Publication No. 2006-38300 (Patent Document 8). However, a motor malfunction cannot be handled, and there is a possibility that the automatic door opening and closing function runs out of control to possibly perform a high speed operation.

Accordingly, in opening/closing a door of a drawer-type cooking device having a manual operation assisting mechanism, there is such a problem to be solved, to detect at least an opening/closing direction of a door by a manual opening/closing operation by a user, and preferably, the opening/closing direction and an absolute position of the door, or furthermore, to detect the opening/closing direction of the door or the absolute position of the door in addition to the opening/closing direction with respect to the opening/closing operation by a user so as to control to perform an appropriate electrically-assisted opening/closing operation.

An object of the present invention is to provide a method for controlling opening and closing of a door for a drawer-type cooking device, in which at least the opening/closing direction of the door by the manual opening/closing operation by a user, and preferably, the absolute position of the door in addition to the opening/closing direction of the door are detected even when the door is in a door-open state in a position other than the fully opened position and the fully closed position, and a drawer-type cooking device allowing the subsequent appropriate electrically-assisted automatic opening/closing operation of the door, and allowing to reduce the number of parts such as a position sensor.

In the field of microwave oven, new distinct configuration of automatic drawer type is emerging of late, for which this invention is intended for a further improvement.

This invention is to enhance safety measures in the automatic drawer operation against electromagnetic or mechanical disturbance as well as component malfunction, in order to improve assurance of operation.

SUMMARY OF THE INVENTION

In order to achieve the above object, a method for controlling opening and closing of a door for a drawer-type cooking device according to the present invention including a door capable of opening and closing an opening of a cooking device body, a motor for driving the door in an opening/closing direction, and a rotation sensor disposed in relation to an output shaft of the motor and generating a detection signal based on rotation of the motor, comprises, at the rotation sensor, generating two rotation pulses having different phases from the motor, and determining a rotation direction of the motor based on the two rotation pulses.

Also, a drawer-type cooking device according to the present invention comprises a door capable of opening and closing an opening of a cooking device body, a motor for driving the door in an opening/closing direction, a rotation sensor disposed in relation to an output shaft of the motor and generating a detection signal based on rotation of the motor, and a control unit for controlling drive of the motor including a rotation direction by receiving an input of the detection signal of the rotation sensor, wherein the rotation sensor is a sensor for generating two rotation pulses having different phases from the motor, and the control unit determines the rotation direction of the motor based on the two rotation pulses from the rotation sensor.

According to the method for controlling opening and closing of a door for a drawer-type cooking device, or the drawer-type cooking device of the present invention, the rotation sensor generates the two rotation pulses having different phases from the motor. According to the phase patterns of the pulses, it is possible to determine whether the door moves in the opening direction or the closing direction regardless of the position of the door. Therefore, it is not necessary to dispose a plurality of sensors along a moving path of the door in order to determine the moving direction from a difference in detection times.

Also, in the method for controlling opening and closing of a door for a drawer-type cooking device, and the drawer-type cooking device, an assisting operation by the motor can be performed by driving the motor in the rotation direction according to the determined rotation direction of the motor. In this case, the operation direction of the door can be immediately determined from the rotation pulses of the motor when the door is manually operated. Therefore, by electrically moving the motor in the same direction as the operation direction of the door, the manual opening/closing operation of the door can be assisted.

Also, in the method for controlling opening and closing of a door for a drawer-type cooking device, and the drawer-type cooking device, the rotation pulses are accumulated to obtain an absolute position of the door in the opening/closing direction In this case, for example, by accumulating the rotation pulses generated by the rotation of the motor from a fully closed position of the door toward the opening direction of the door, a moving distance from the fully closed position toward the opening direction can be obtained as the absolute position.

Furthermore, in the method for controlling opening and closing of a door for a drawer-type cooking device, and the drawer-type cooking device, for obtaining the absolute position of the door in the opening/closing direction, speed control of the door can be performed based on the absolute position. In this case, if the absolute position of the door can be obtained, the speed of the motor is controlled according to the absolute position to perform such opening and closing speed control of the door that, for example, the moving speed of the door is decreased when the door moves closer to a fully opened or fully closed position and the moving speed of the door is set to high in an intermediate position.

Also, a drawer-type cooking device according to the present invention comprises a door capable of opening and closing an opening of a cooking device body, a motor for driving the door in an opening/closing direction, a rotation sensor disposed in relation to an output shaft of the motor and generating a detection signal based on rotation of the motor, and a control unit for controlling drive of the motor including a rotation direction by receiving an input of the detection signal of the rotation sensor, wherein, when a malfunction occurs in the motor for driving the door due to breakdown or short circuit in the motor wiring, the malfunction can be immediately detected.

Since the method for controlling opening and closing of a door for a drawer-type cooking device, or the drawer-type cooking device according to the present invention is configured as described above, the following advantages can be obtained. That is, the present invention is the cooking device having the drawer-type door which is automatically opened and closed by controlling the motor. The moving direction of the door, namely, whether the door is moving in the opening direction or the closing direction, is detected in any open/close position based on the two rotation pulses having different phases from the motor. Therefore, in a manual opening/closing operation, whether the door is moving in the opening direction or the closing direction can be also detected and determined in any door position by detecting the rotation direction of the motor rotated by the manual opening/closing operation. Also, a manual operation assisting operation is enabled in any open/close position. Furthermore, it is not necessary to dispose a plurality of position switches along an open/close path in order to detect the opening/closing direction of the door.

Moreover, according to the present invention, the absolute position of the door can be detected as the moving distance from, for example, the fully closed position of the door by accumulation based on rotation pulse signals. Accordingly, it is possible to move the door at an appropriate opening/closing speed, by which it is possible to prevent a user from getting his/her fingers stuck in the door or food from spilling, in an automatic opening/closing operation from any open/close position.

Furthermore, by determining the malfunction such that the door moves even though the automatic opening/closing operation is not performed, it is possible to control to give a warning to a user or to stop the opening and closing mechanism itself. Accordingly, a more secure drawer-type cooking device can be provided.

BRIEF DESCRIPTION OF THE DRAWINGS

FIG. 1 is a waveform chart illustrating rotation pulses detected by a sensor provided in a door driving motor of a drawer-type cooking device;

FIG. 2 is a schematic view illustrating one example of a rotation sensor provided in a drawer-type cooking device according to the present invention;

DETAILED DESCRIPTION OF THE PREFERRED EMBODIMENTS

Figure 3:
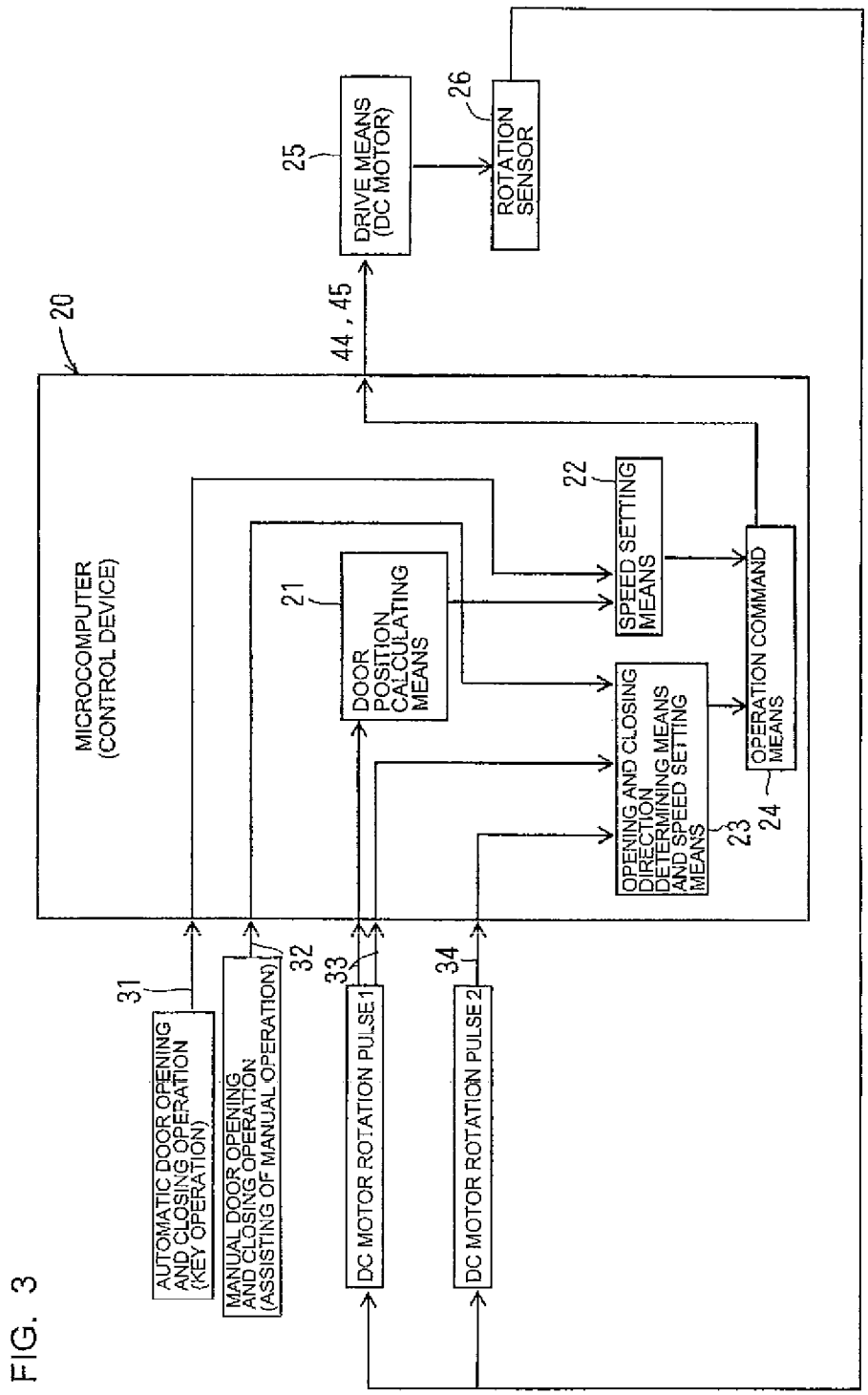
FIG. 3 is a block diagram illustrating one example of a control unit provided in a drawer-type cooking device according to the present invention.

An embodiment of a method for controlling opening and closing of a door for a drawer-type cooking device, and a drawer-type cooking device according to the present invention will be described below based on the accompanying drawings. FIG. 1 is a waveform chart illustrating rotation pulses detected by a sensor provided in a door driving motor as one embodiment of the drawer-type cooking device according to the present invention. In the pulse waveform chart shown in FIG. 1, FIG. 1A is a waveform chart of rotation pulses when the door is opened, and FIG. 1B is a waveform chart of rotation pulses when the door is closed.

FIG. 2 illustrates one example of a rotation sensor. As shown in FIG. 2, a rotation sensor 26 is provided relative to a rotation shaft 11 of a DC motor for opening and closing a door which rotates in association with opening and closing of the door. A disk 12 in which two magnets 13a and 13b are disposed in different angle positions from each other (for example, 120 degrees away from each other as an angle difference) is attached to the rotation sensor 26. A hall element 14 is provided as a detector in a fixed position around the rotation shaft. The rotation sensor 26 is a magnetic type. Alternatively, an optical type rotation sensor having a combination of two light passage holes formed in the disk in the same positions as those of the magnets and a light receiving element, instead of the hall element, for receiving lights which pass through the light passage holes from a light emitting element may be employed.

As shown in the rotation pulse waveform charts when the door is opened and closed, the magnets pass by the position of the hall element 14 in the order of the magnet 13a and the magnet 13b when the door is opened (FIG. 1A). Therefore, a rotation pulse No. 1 (referred to as "pulse 1" below) is always generated with a leading phase of 120 degrees from a rotation pulse No. 2 (referred to as "pulse 2", below). In a control unit side for controlling opening and closing of the door, input signals of the pulse 1, the pulse 2, and no pulse are sequentially repeated in the order of time when the pulse 1 and the pulse 2 are respectively input in a distinguishable manner.

On the other hand, when the door is closed, rotation of the rotation shaft 11 of the DC motor is reversed, and the magnets pass by the position of the hall element 14 in the order of the magnet 13b and the magnet 13a. In the control unit side, input signals of the pulse 1, no pulse, and the pulse 2 are sequentially repeated in the order of time.

The control unit receives the input of the two rotation pulses having different phases output by the rotation sensor 26 to determine the motor rotation direction based on the patterns of the rotation pulses. In a manual opening/closing operation, the control unit can also determine whether the operation direction of the door is the opening direction or the closing direction by receiving the input of the rotation pulses from the motor which is rotated by the manual operation. By determining the opening/closing direction of the door based on the generation order of the pulse 1 and the pulse 2 by the control unit, the door opening/closing direction not only in a fully opened position and a fully closed position of the door but in any open/close position can be determined.

Also, an absolute position in any open/close position of the door can be detected by, for example, giving an encoder function of outputting six rotation pulses during one rotation of the rotation shaft of the motor and accumulating the rotation pulses from the fully opened position or the fully closed position. Such an absolute position can be calculated by the generated number of one of the pulses (for example, the pulse 1).

FIG. 3 is a block diagram of the control device. An operation signal 31 by an automatic door opening/closing operation by a key operation, an operation signal 32 by a manual door opening/closing operation (a so-called manual operation assisting operation), a pulse 1 signal 33 and a pulse 2 signal 34 by the rotation of the DC motor are input to a microcomputer 20 which is control means.

The pulse 1 signal 33 is input to door position calculating means 21 and a door position is calculated. At the time of the automatic opening/closing of the door by a key operation, speed setting means 22 sets the speed of opening/closing the door according to the opening or closing operation signal 31 and the door position calculated by the door position calculating means 21. Also, the pulse 1 signal 33, the pulse 2 signal 34, and the operation signal 32 by the manual operation at the time of assisting the manual operation are input to opening and closing direction determining means and speed setting means 23, which determines in which direction the door is operated by the manual door opening/closing operation, and sets the moving speed of the door to be driven in the determined direction.

The rotation direction and the setting speed set by the speed setting means 22 or the opening and closing direction determining means and speed setting means 23 are input to operation command means 24. The operation command means 24 outputs a drive signal to a DC motor 25 which is drive means to drive the DC motor 25. The rotation of the DC motor 25 is detected as the pulse 1 and the pulse 2 by the rotation sensor 26 described above.

Figure 4:
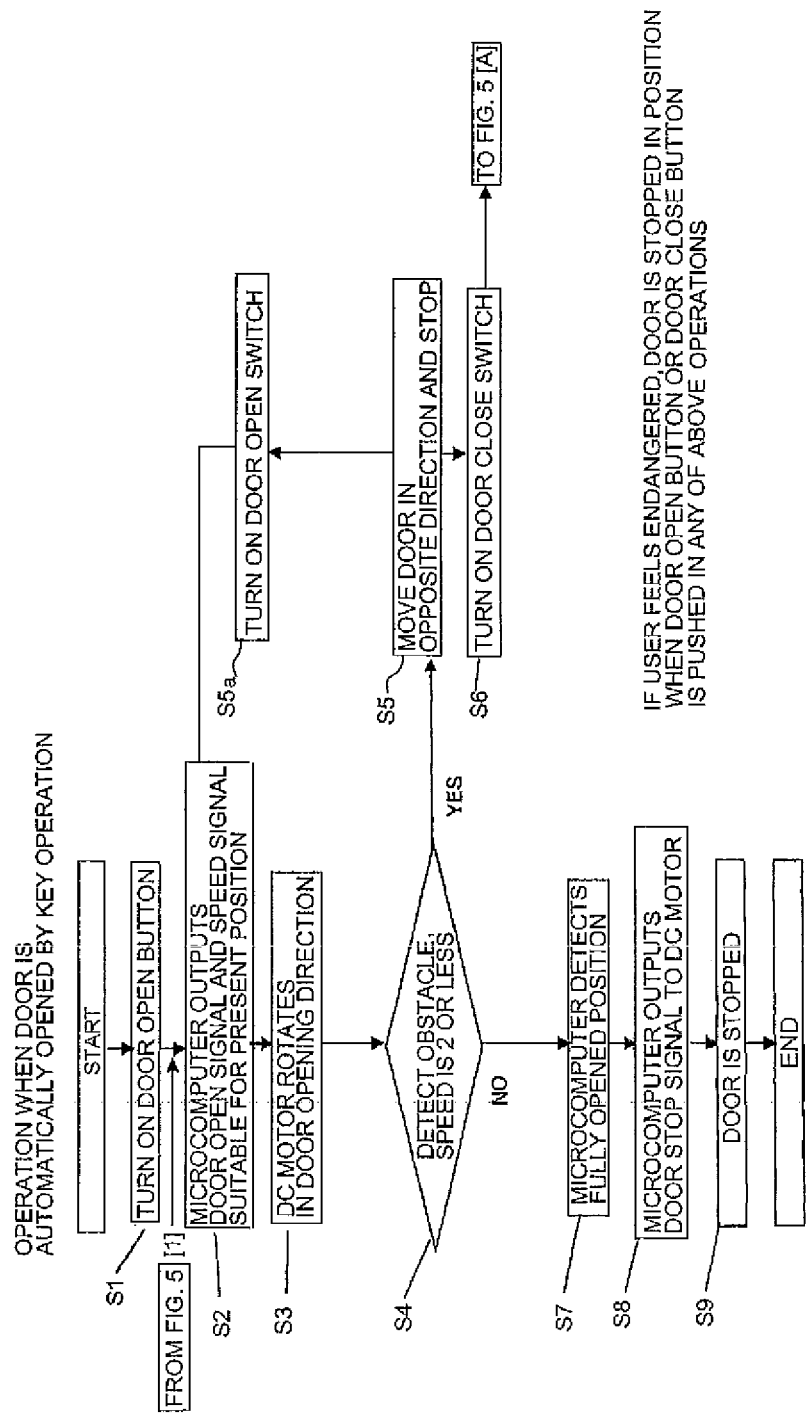
FIG. 4 is a control flowchart illustrating one example of controlling an automatic door opening operation by a key operation in a drawer-type cooking device according to the present invention.

FIG. 4 is a control flowchart of the automatic opening operation of the door by a key operation.

When the control operation is started, first, a door open button is turned ON by the key operation by a user (step 1, abbreviated to "S1" below). As shown in the block diagram of FIG. 3, a door open signal and a setting speed signal suitable for the present position are output from the microcomputer 20 (S2) The DC motor rotates to drive the door in the opening direction based on the output from the microcomputer 20 (S3).

During the opening operation of the door, it is determined whether a collision with an obstacle, by which the door opening speed becomes 2 or less (the second level from the lowest level of the setting speed, same in the following), is detected (S4).

When it is determined YES in S4, that is, when a relatively large obstacle to the door is detected, the door is moved in the opposite direction (the closing direction) and then is stopped (S5). In other words, the door is moved away from the obstacle and then is stopped. After that, if the door open switch is turned ON again (S5a), the step returns to S2 and the above operations are repeated. Also, if a door close switch is turned ON (S6), the step moves to [A] in FIG. 5.

When it is determined NO in S4, that is, when the door does not encounter a large obstacle, the opening operation of the door is continued until the microcomputer 20 detects the fully opened position (S7). In response to that the fully opened position of the door is detected, the microcomputer 20 outputs a door stop signal to the DC motor 25 (S8) The opening operation of the door is stopped in response to the door stop signal (S9).

If a user feels endangered during the opening operation of the door, it is preferable to stop the door in a position when the door open button or the door close button is pushed during any operation of the above S1 to S9.

Figure 5:
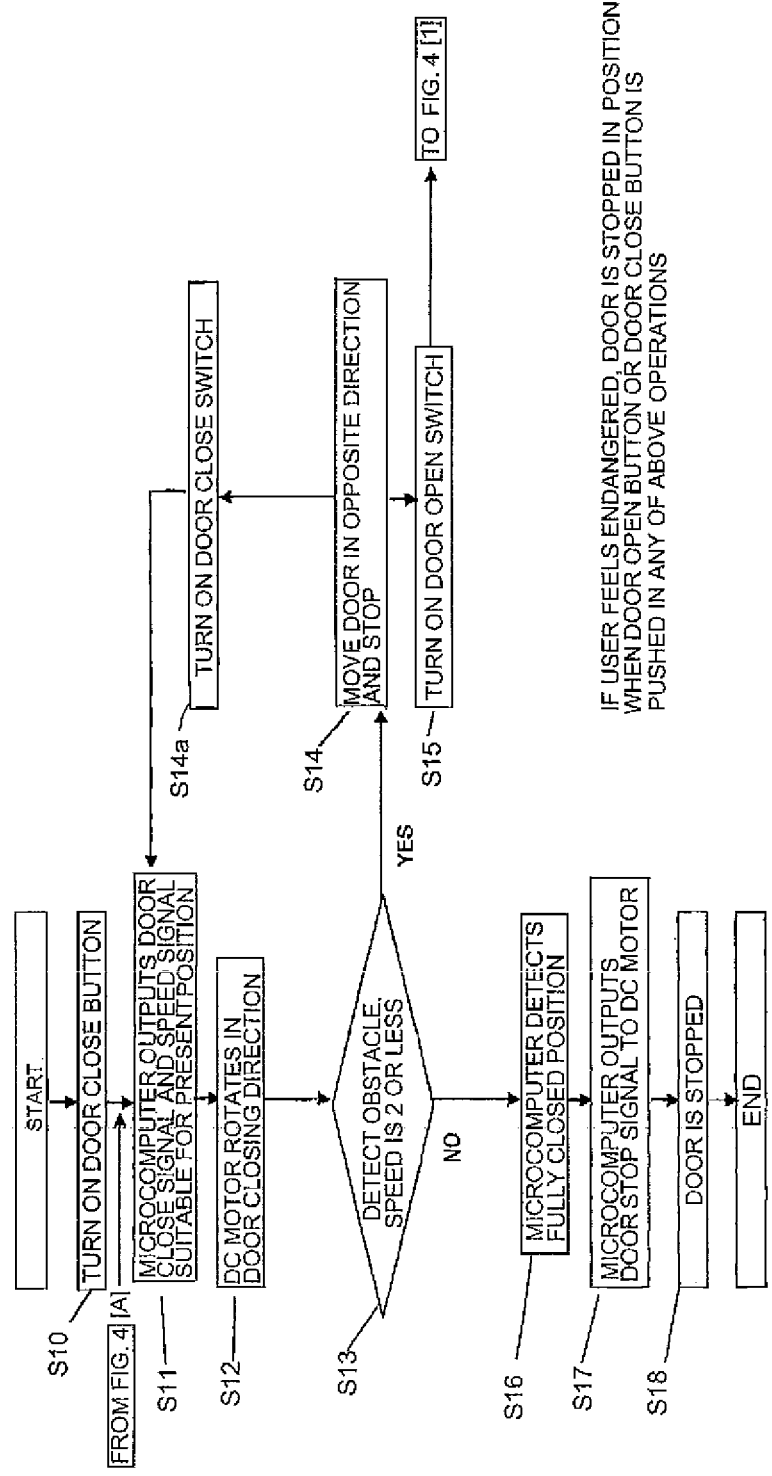
FIG. 5 is a control flowchart illustrating one example of controlling an automatic door closing operation by a key operation in a drawer-type cooking device according to the present invention.

FIG. 5 is a control flowchart of the automatic closing operation of the door by a key operation.

The control operation is the same as that in the control flowchart of the automatic opening operation of the door shown in FIG. 4 except that the opening/closing direction is different. That is, when the control operation is started, first, the door close button is turned ON by the key operation by a user (S10). As shown in the block diagram of FIG. 3, a door close signal and a setting speed signal suitable for the present position are output from the microcomputer 20 (S11). The DC motor rotates to drive the door in the closing direction based on the output from the microcomputer 20 (S12).

During the closing operation of the door, it is determined whether a collision with an obstacle, by which the door closing speed becomes 2 or less, is detected (S13).

When it is determined YES in S13, that is, when a relatively large obstacle to the door is detected, the door is moved in the opposite direction (the opening direction) and then is stopped (S14). In other words, the door is moved away from the obstacle and then is stopped. After that, if the door close switch is turned ON again (S14a), the step returns to S11 and the above operations are repeated. Also, if the door open switch is turned ON (S15), the step moves to [1] in FIG. 4.

When it is determined NO in S13, that is, when the door does not encounter a large obstacle, the closing operation of the door is continued until the microcomputer 20 detects the fully closed position (S16). In response to that the fully closed position of the door is detected, the microcomputer 20 outputs a door stop signal to the DC motor 25 (S17). The closing operation of the door is stopped in response to the door stop signal (S18).

If a user feels endangered during the closing operation of the door, it is preferable to stop the door in a position when the door open button or the door close button is pushed during any operation of the above S10 to S18.

Figure 6:
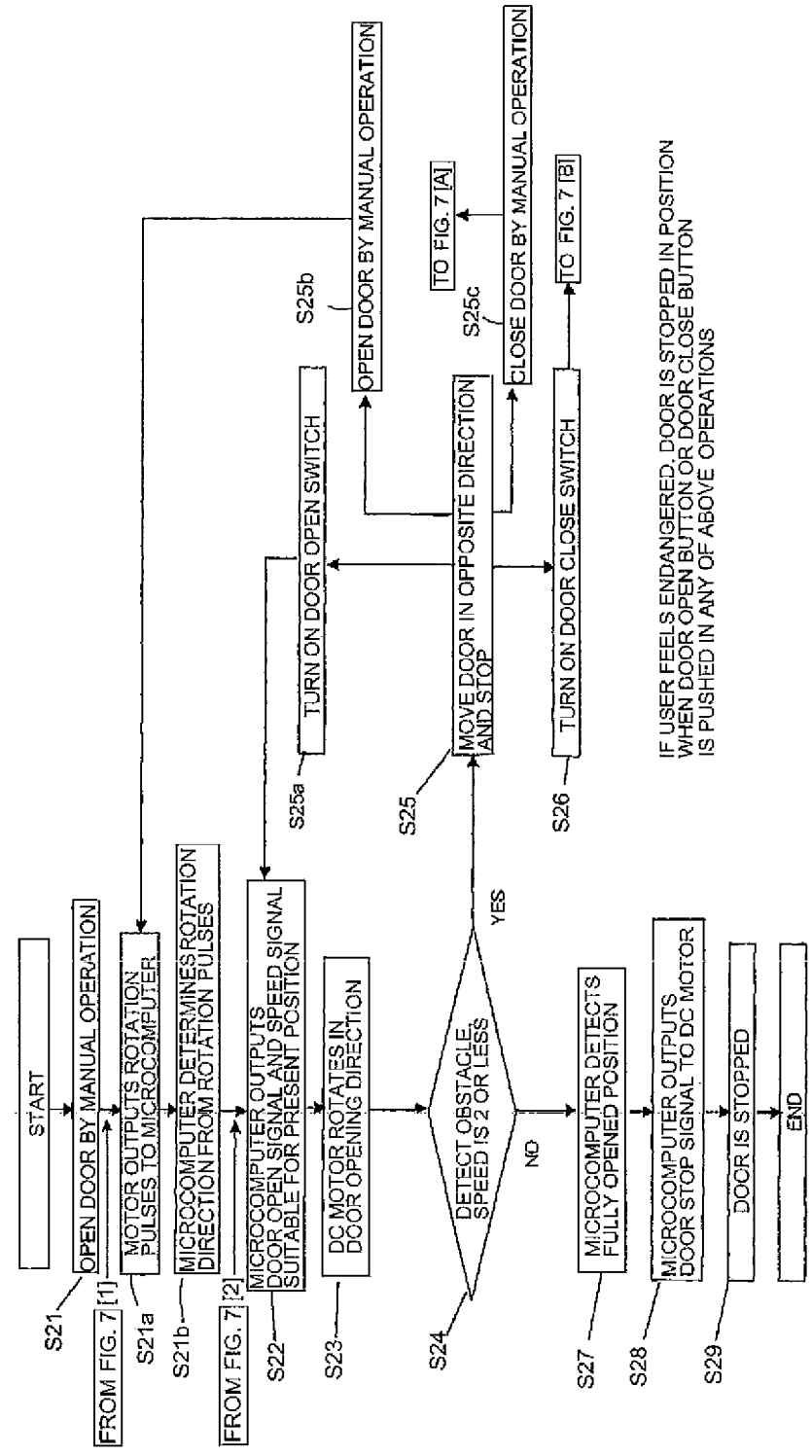
FIG. 6 is a control flowchart illustrating one example of an automatic door opening operation according to a manual operation assisting operation in a drawer-type cooking device according to the present invention.

FIG. 6 is a control flowchart of the automatic opening operation of the door according to a manual operation assisting operation.

When the control operation is started, first, a door opening operation is performed by a manual operation by a user (S21). As shown in the block diagram of FIG. 3, the DC motor 25 is rotated in response to the door opening operation, and the rotation pulses are output to the microcomputer 20 (S21a). The microcomputer 20 determines the rotation direction from the rotation pulse signals (S21b). Also, a door open signal and a setting speed signal suitable for the present position are output from the microcomputer 20 (S22). The DC motor 25 rotates to drive the door in the opening direction based on the output from the microcomputer 20 (S23).

During the opening operation of the door, it is determined whether a collision with an obstacle, by which the door opening speed becomes 2 or less, is detected (S24).

When it is determined YES in S24, that is, when a relatively large obstacle to the door is detected, the door is moved in the opposite direction (the closing direction) and then is stopped (S25). In other words, the door is moved away from the obstacle and then is stopped. After that, if the door open switch is turned ON again (S25a), the step returns to S22 and the above control operations are repeated. If the door close switch is turned ON (S26), the step moves to [B] in FIG. 7. Also, if the door opening operation is manually performed after the door is moved in the opposite direction and is stopped in S25 (S25b), the step returns to S21a and the above control operations are repeated. If the door closing operation is manually performed (S25c), the step moves to [A] in FIG. 7.

When it is determined NO in S24, that is, when the door does not encounter a large obstacle, the opening operation of the door is continued until the microcomputer 20 detects the fully opened position (S27). In response to that the fully opened position of the door is detected, the microcomputer 20 outputs a door stop signal to the DC motor 25 (S28). The opening operation of the door is stopped in response to the door stop signal (S29).

In the automatic opening operation of the door according to the manual operation assisting operation, if a user feels endangered during the opening operation of the door, it is also preferable to push the door open button or the door close button and stop the door in a position when the button is pushed during any operation of the above S21 to S29.

Figure 7:
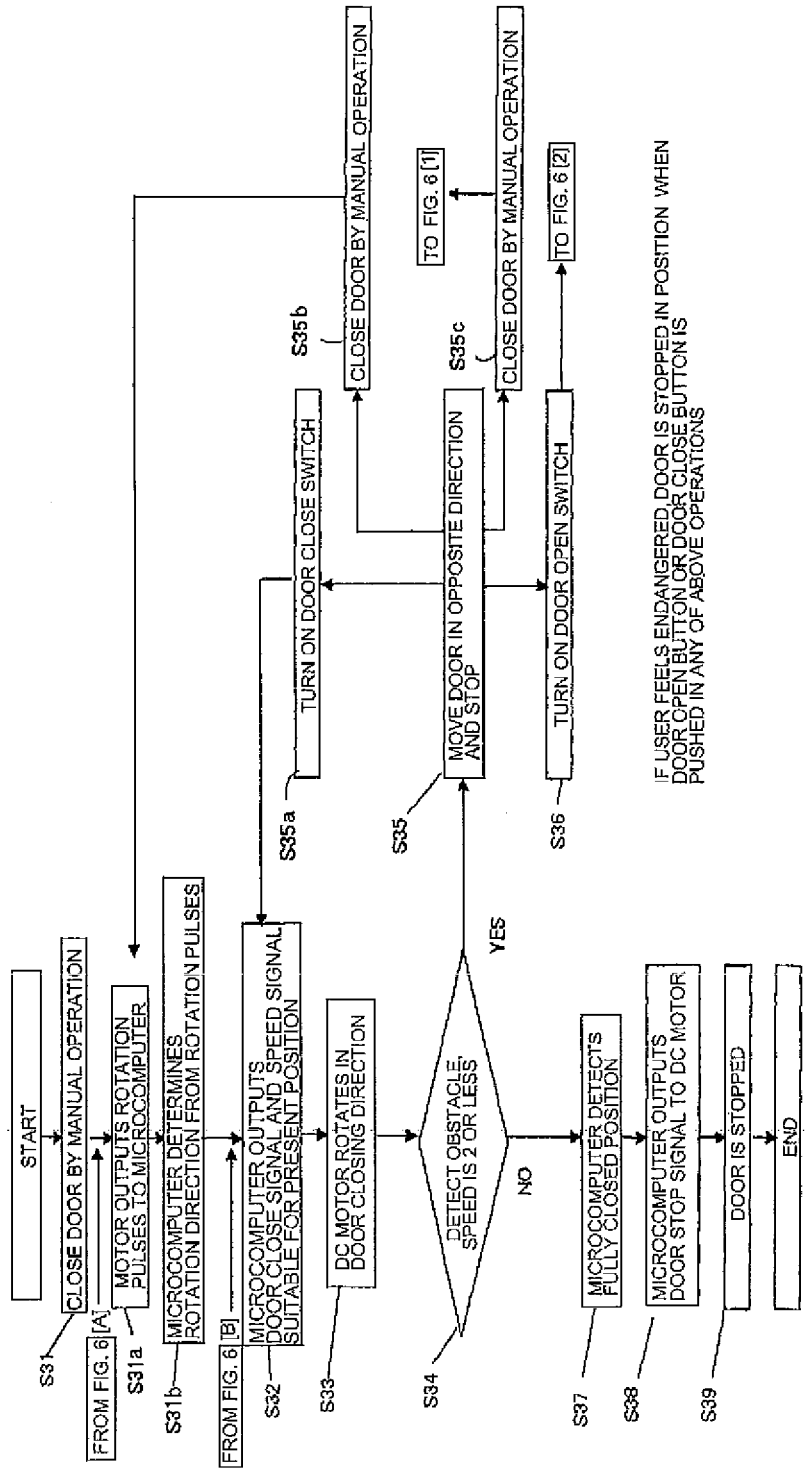
FIG. 7 is a control flowchart illustrating one example of an automatic door closing operation according to a manual operation assisting operation in a drawer-type cooking device according to the present invention.

FIG. 7 is a control flowchart of the automatic closing operation of the door according to a manual operation assisting operation.

The control operation is the same as that in the control flowchart of the automatic opening operation of the door shown in FIG. 6 except that the opening/closing direction is different. That is, when the control operation is started, first, a door closing operation is performed by a manual operation by a user (S31). As shown in the block diagram of FIG. 3, the DC motor 25 is rotated in response to the door closing operation, and the rotation pulses are output to the microcomputer 20 (S31a). The microcomputer 20 determines the rotation direction from the rotation pulse signals (S31b). Also, a door close signal and a setting speed signal suitable for the present position are output from the microcomputer 20 (S32). The DC motor rotates to drive the door in the closing direction based on the output from the microcomputer 20 (S33).

During the closing operation of the door, it is determined whether a collision with an obstacle, by which the door closing speed becomes 2 or less, is detected (S34).

When it is determined YES in S34, that is, when a relatively large obstacle to the door is detected, the door is moved in the opposite direction (the opening direction) and then is stopped (S35). In other words, the door is moved away from the obstacle and then is stopped. After that, if the door close switch is turned ON again (S35a), the step returns to S32 and the above control operations are repeated. If the door open switch Also, if the door closing operation is manually performed after the door is moved in the opposite direction and is stopped in S35 (S35b), the step returns to S31a and the above control operations are repeated. If the door opening operation is manually performed (S35c), the step moves to [1] in FIG. 6.

When it is determined NO in S34, that is, when the door does not encounter a large obstacle, the closing operation of the door is continued until the microcomputer 20 detects the fully closed position (S37). In response to that the fully closed position of the door is detected, the microcomputer 20 outputs a door stop signal to the DC motor 25 (S38). The closing operation of the door is stopped in response to the door stop signal (S39).

In the automatic closing operation of the door according to the manual operation assisting operation, if a user feels endangered during the closing operation of the door, it is also preferable to push the door open button or the door close button and stop the door in a position when the button is pushed during any operation of the above S31 to S39.

If the door is automatically opened at a high speed when the inside of a heating chamber is in a high temperature state after cooking, a user could be damaged such as burn. Thus, a malfunction countermeasure is taken in the present invention. If such a structure that a malfunction does not occur even if a plurality of failures occur at the same time can be obtained by failure mode and effects analysis (FMEA), the malfunction countermeasure is not required. That is, it is preferable to employ a fail-safe structure in which the DC motor is stopped in the case where breakdown or short circuit in the motor wiring occurs As described above, in a drawer-type microwave oven, there is a very low possibility that an accident causing a serious damage such as burn and injury occurs even if the microwave oven malfunctions. Thus, it is effective to apply the malfunction countermeasure only in a case expected to cause a particularly dangerous situation when a malfunction occurs.

Figure 8:
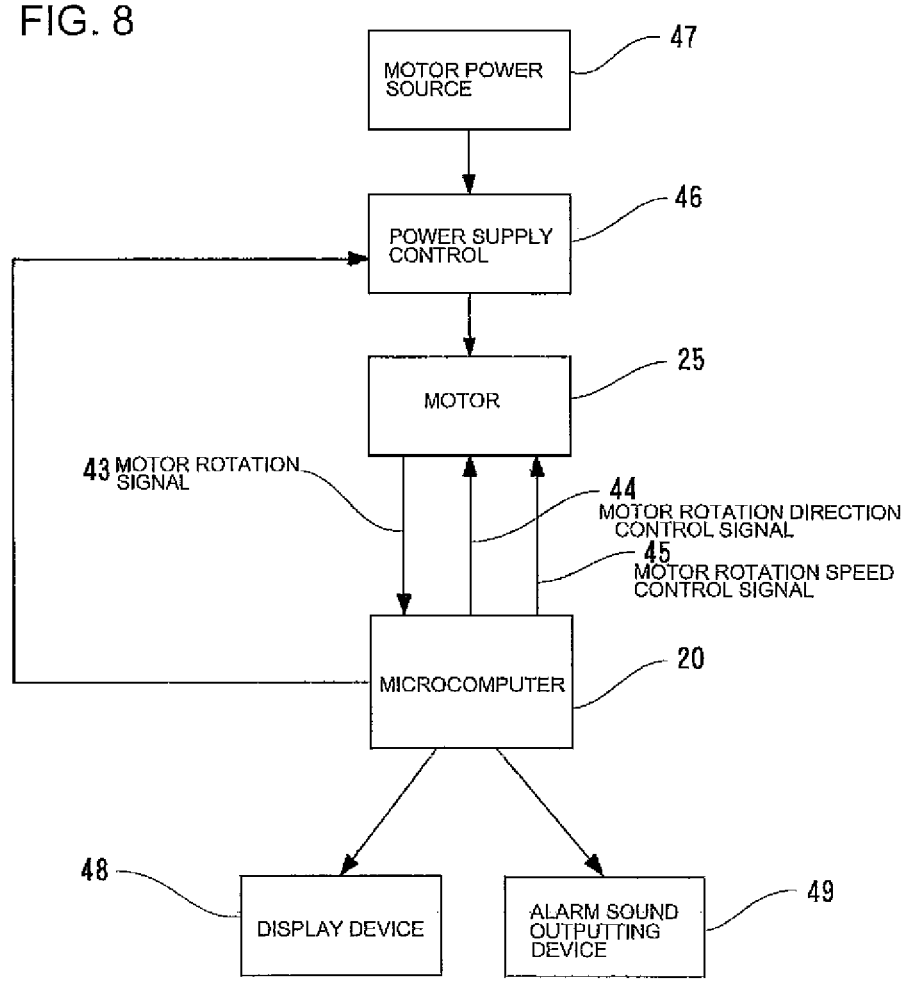
FIG. 8 is a block diagram illustrating one example of a motor control unit in a drawer-type cooking device according to the present invention.
Figure 9:
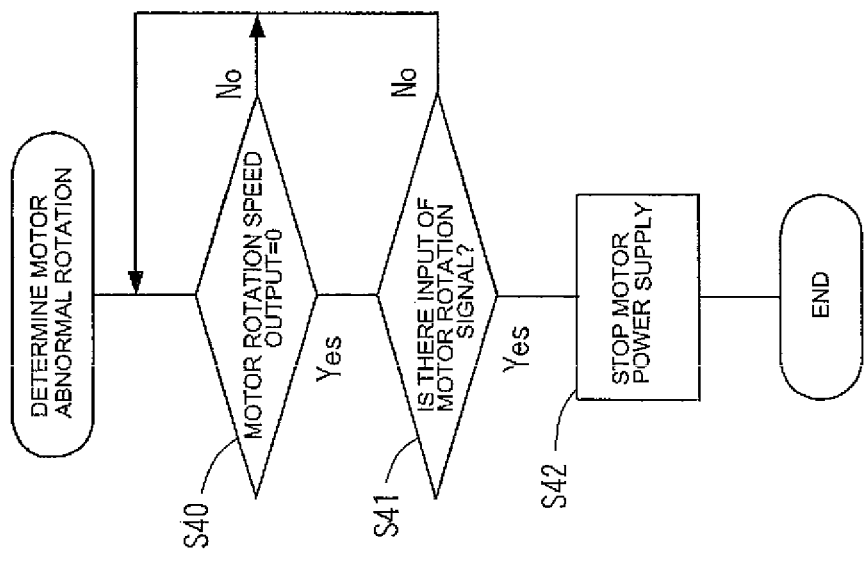
FIG. 9 is a control flowchart corresponding to the control block diagram shown in FIG. 8.
Figure 10:
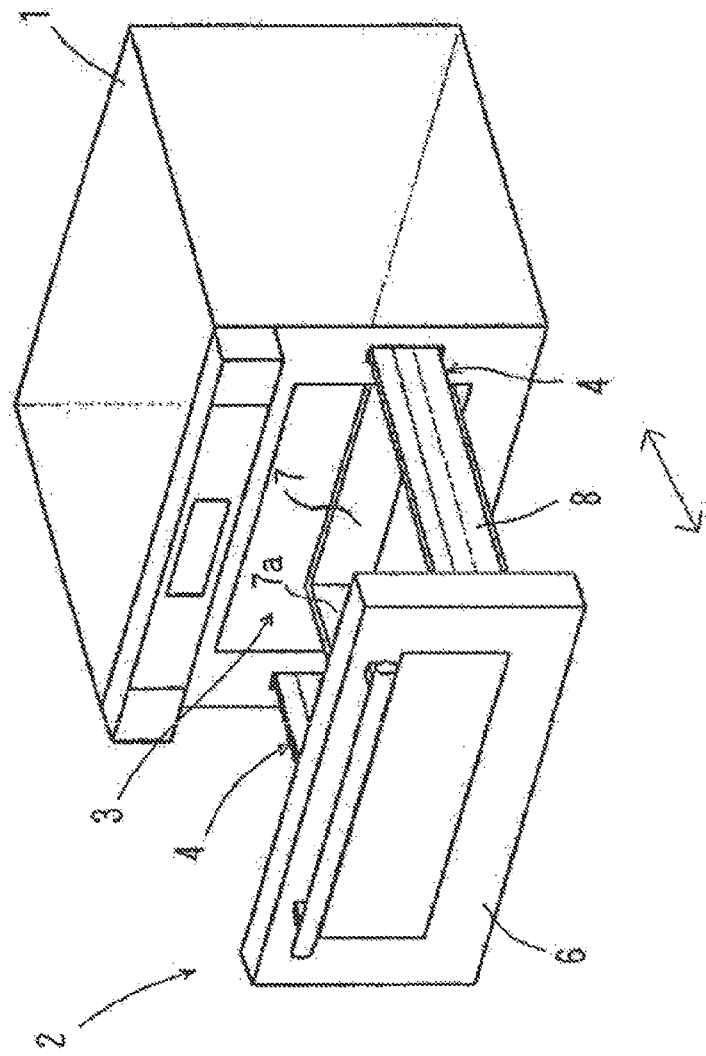
FIG. 10 is a perspective view of a drawer-type cooking device having a known structure.
Figure 11:
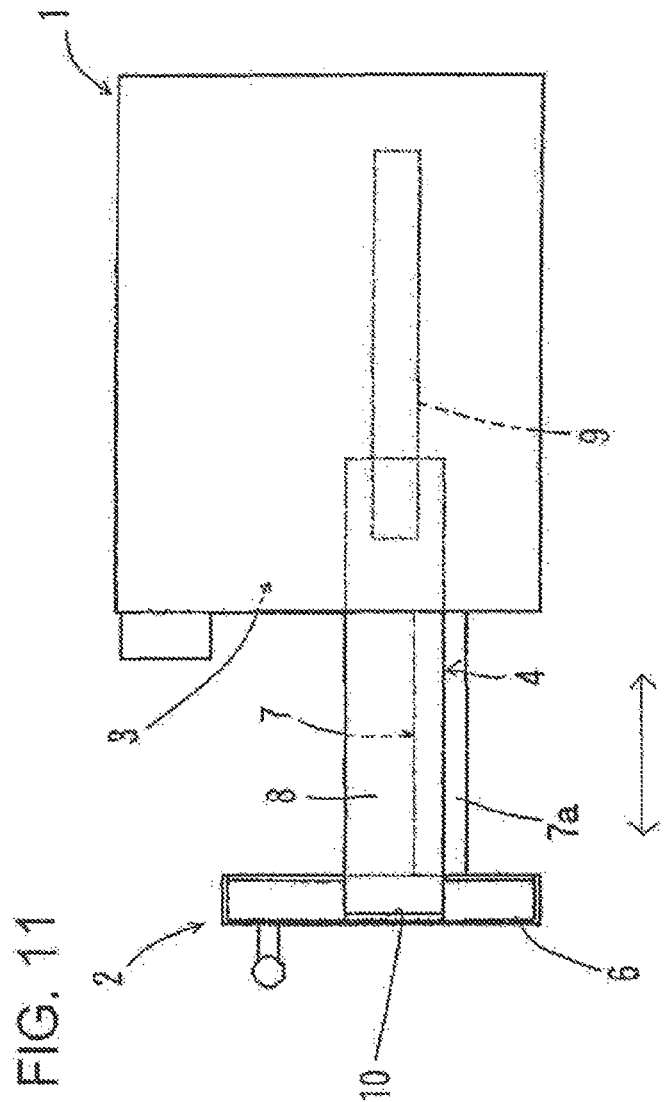
FIG. 11 is a side view of the drawer-type cooking device shown in FIG. 10.

FIG. 8 is a block diagram of a motor control unit, and FIG. 9 is a control flowchart thereof. In the malfunction countermeasure, a malfunction is determined by detecting that the door is moving even though the automatic opening/closing operation is not performed to control to give a warning to a user or to stop the opening and closing mechanism itself. By such a countermeasure, a more secure drawer-type automatic door can be provided.

The microcomputer 20 (corresponding to the microcomputer 20 in the block diagram shown in FIG. 3) outputs a rotation speed control signal 45 and a rotation direction control signal 44 to the motor 25 for driving the door (corresponding to the motor 25 in the block diagram shown in FIG. 3). A motor power source 47 supplies power to the motor 25 through power supply means 46. The power supply means 46 is also controlled by the microcomputer 20. The motor 25 rotates to output a rotation signal 43, and inputs the signal to the microcomputer 20.

Abnormal rotation of the motor is determined by the procedure shown in FIG. 9. That is, when the motor 25 is being stopped, a speed zero signal, namely, a stop signal is output as the rotation speed control signal. Therefore, first, it is determined whether a motor rotation speed output is zero or not (S40). When the motor rotation speed output is not zero (the determination result in S40 is No), the determination in S40 is repeated. When the motor rotation speed output is zero (the determination result in S40 is Yes), it is determined whether there is an output from the motor rotation signal 43 (S41). When there is no output from the motor rotation signal 43 (the determination result in S41 is No), there is no malfunction occurring and the operations of S40 and S41 are repeated. When there is an output from the motor rotation signal 43 (the determination result in S41 is Yes), the microcomputer 20 determines that the motor malfunctions, and controls the motor power supply device 46 to stop power supply (S42). A warning display or a warning sound may be respectively given to a display device 48 or an alarm sound outputting device 49 at the same time as the power supply stop.

What is claimed is:

1. A method for controlling opening and closing of a door for a drawer-type cooking device including a door capable of opening and closing an opening of a cooking device body: a motor for driving the door in an opening/closing direction, and a magnetic type rotation sensor disposed in relation to an output shaft of the motor and generating a detection signal based on rotation of the motor wherein a disk in which two magnets are disposed in different angle positions from each other is attached to the rotation sensor, the method comprising: at the rotation sensor, generating two rotation pulses having different phases according to a rotation direction of the motor; determining the rotation direction of the motor based on the two rotation pulses; performing an assisting operation of opening and closing the door by driving the motor in the rotation direction according to the determined rotation direction of the motor.

2. The method for controlling opening and closing of a door for a drawer-type cooking device according to claim 1, further comprising accumulating the rotation pulses and obtaining an absolute position of the door in the opening/closing direction.

3. The method for controlling opening and closing of a door for a drawer-type cooking device according to claim 2, further comprising performing speed control of the door based on the absolute position.

4. A drawer-type cooking device comprising: a door capable of opening and closing an opening of a cooking device body; a motor for driving the door in an opening/closing direction; a rotation sensor disposed in relation to an output shaft of the motor and generating a detection signal based on rotation of the motor wherein a disk in which two magnets are disposed in different angle positions from each other is attached to the rotation sensor; and a control unit for controlling drive of the motor including a rotation direction by receiving an input of the detection signal of the rotation sensor, wherein the rotation sensor is a magnetic type sensor device for generating two rotation pulses having different phases according to a rotation direction of the motor; the control unit determines the rotation direction of the motor based on the two rotation pulses from the rotation sensor; the control device performs an assisting operation of opening and/or closing the door by driving the motor in the rotation direction according to the determined rotation direction of the motor.

5. The drawer-type cooking device according to claim 4, wherein the rotation pulses are accumulated to obtain an absolute position of the door in the opening/closing direction.

6. The drawer-type cooking device according to claim 5, wherein speed control of the door is performed based on the absolute position.

7. A drawer-type cooking device comprising: a door capable of opening and closing an opening of a cooking device body; a motor for driving the door in an opening/closing direction; a magnetic type rotation sensor disposed in relation to an output shaft of the motor and generating a directional detection signal based on rotation of the motor wherein a disk in which two magnets are disposed in different angle positions from each other is attached to the rotation sensor; and a control unit for controlling drive of the motor including a rotation direction by receiving an input of the detection signal of the rotation sensor, wherein when a malfunction occurs in the motor for driving the door by breakdown or short circuit in the motor wiring, the malfunction is immediately detected.

* * * * *